(12) United States Patent
Larson

(10) Patent No.: US 6,598,645 B1
(45) Date of Patent: Jul. 29, 2003

(54) TIRE WITH AT LEAST ONE OF RUBBER/ CORD LAMINATE, SIDEWALL INSERT AND APEX OF A RUBBER COMPOSITION WHICH CONTAINS ORIENTED INTERCALATED AND/OR EXFOLIATED CLAY REINFORCEMENT

(75) Inventor: Brent Kevin Larson, Fairlawn, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 2 days.

(21) Appl. No.: 09/671,097

(22) Filed: Sep. 27, 2000

(51) Int. Cl.⁷ .............................. B60C 1/00; B60C 9/02; B60C 9/18; B60C 13/00
(52) U.S. Cl. ................ 152/548; 152/525; 152/539; 152/541; 152/564; 152/547; 524/445; 524/791
(58) Field of Search .................... 152/537, 541, 152/547, 564, 525, 539, 548; 524/445–447, 789, 791

(56) References Cited

U.S. PATENT DOCUMENTS

| | | | |
|---|---|---|---|
| 3,310,094 A | 3/1967 | Prevost | 152/361 |
| 4,431,755 A | 2/1984 | Weber et al. | 523/203 |
| 4,739,077 A | 4/1988 | White | 548/954 |
| 4,810,734 A | 3/1989 | Kawasumi et al. | 523/216 |
| 5,385,776 A | 1/1995 | Maxfield et al. | 428/297 |
| 5,578,672 A | 11/1996 | Beall et al. | 524/446 |
| 5,665,183 A * | 9/1997 | Kresge et al. | 152/203 |
| 5,804,613 A * | 9/1998 | Beall et al. | 106/416 |
| 5,840,796 A | 11/1998 | Badesha et al. | 524/449 |
| 5,883,173 A * | 3/1999 | Elspass et al. | 524/445 |
| 6,300,421 B1 * | 10/2001 | Blok et al. | 525/331.1 |

FOREIGN PATENT DOCUMENTS

| | | | |
|---|---|---|---|
| WO | 9856598 | 12/1998 | B60C/1/00 |

OTHER PUBLICATIONS

European Search Report.

\* cited by examiner

*Primary Examiner*—Michael W. Ball
*Assistant Examiner*—Justin Fischer
(74) *Attorney, Agent, or Firm*—Henry C. Young, Jr.

(57) ABSTRACT

A tire with at least one component of a rubber composition which contains oriented exfoliated platelets derived from an intercalated clay. Such tire component may be, for example, a rubber/cord laminate and, optionally, a sidewall insert and, optionally, an apex.

20 Claims, No Drawings

TIRE WITH AT LEAST ONE OF RUBBER/CORD LAMINATE, SIDEWALL INSERT AND APEX OF A RUBBER COMPOSITION WHICH CONTAINS ORIENTED INTERCALATED AND/OR EXFOLIATED CLAY REINFORCEMENT

FIELD OF THE INVENTION

This invention relates to a tire with a rubber/cord laminate, sidewall insert and/or apex of a rubber composition which contains a reinforcement as oriented clay particles of which at least a portion thereof is exfoliated.

BACKGROUND OF THE INVENTION

The invention relates to use of oriented intercalated clay and exfoliated portions thereof in rubber compositions for certain components of a tire of a conventional toroidal shape having an inherent cavity wherein the cavity is designed to be closed by a rigid rim. Such tires may sometimes be referred to as having an open toriodal shape.

In particular, tire carcass plies, carcass belts, sidewall inserts and apex components are addressed for use of such oriented intercalated clay and exfoliated portions thereof Such intercalated clay particles and exfoliated platelets are envisioned as being of relatively thin, elongated shapes.

In practice, intercalated clay and exfoliated portions thereof are contained substantially in a primary orientation in a direction of the elongation of the clay particles and platelets and a secondary orientation essentially at right angles to the elongation of the clay particles and platelets in the associated rubber compositions for such tire components.

Rubber compositions for such tire components are typically reinforced with particulate carbon black and/or synthetic amorphous silica to aid in achieving one or more desired physical properties.

Clay has also been suggested for use in various rubber compositions for various purposes.

U.S. Pat. No. 5,840,796, for example, describes a polymer nanocomposite comprised of a mica layered silicate and a fluoroelastomer, wherein the nanocomposite has an intercalated structure and/or exfoliated structure. A multilayered Montmorillonite clay is said to be an example of a suitable clay. Its examples utilized an organophyllic clay which contained a dimethyl dioctadecyl ammonium salt within its layered structure which had been prepared by mixing the clay with an aqueous solution of quaternary ammonium salt. The resultant organophyllic clay was milled together with a fluoroelastomer to form either (1) an intercalated clay in which the fluoroelastomer penetrated the treated clay layers and spread them apart or (2) a randomly distributed exfoliated clay in the, fluoroelastomer wherein the intercalated clay was submitted to additional mill mixing at an elevated temperature in which X-ray diffraction analysis was said to provide no evidence of layer spacing or crystal ordering, thereby providing evidence that exfoliation had taken place.

U.S. Pat. No. 4,431,755, for example, describes the blending of an adduct of a phyllosilicate mineral filler (e.g. a smectite clay composed of expandable three-layer structures such as, for example, a Montmorillonite clay) and a quaternary ammonium salt with at least one rubber and an organosilane. Various quaternary ammonium salts are disclosed.

Historically, an intercalated clay is conventionally prepared by (A) obtaining a smectite clay, other than a koalin type clay, namely a clay such as for example a Montmorillonite clay, which is comprised of a plurality of stacked layers, or platelets and which is swellable upon dispersion in water, (B) dispersing the clay in an aqueous solution of a surfactant (e.g. a quaternary ammonium salt) which causes the clay to swell so that the average spacing between the platelets expands from about 4 Angstroms to an average spacing in a range of about 10 to about 30 Angstroms, followed by (C) drying the treated, or intercalated, clay.

The smectite clay (e.g. a Montmorillonite clay) for use in this invention contains sodium ions between its layered platelets and the larger surfactant molecules contained in the water solution in which the clay is immersed position themselves between the layered platelets by an ion exchange with the sodium ions to cause or otherwise enhance the separation of the platelets to make the platelets more amenable to subsequent exfoliation.

Upon blending of the intercalated clay with a thermoplastic or thermosetting polymer, a portion of the platelets exfoliate, or delaminate, from the clay composite into a multiplicity of planar platelet-like particles, and possibly fractions of the platelets, within the polymer. For example, see U.S. Pat. Nos. 4,739,007; 4,810,734; 5,385,776 and 5,578,672.

While, as discussed above, particulate carbon black and amorphous silica, and sometimes clay, have heretofore been used for reinforcing rubber compositions for various tire components, a tire with certain component(s) comprised of a rubber composition which contains an intercalated organoclay which is at least partially exfoliated in situ within the elastomer host is considered herein to be novel and inventive.

For the description of this invention, the term "elastomer exfoliated nanoclay composite" means, unless otherwise indicated herein, an elastomer composition which contains an intercalated clay, in which the intercalated clay is at least partially exfoliated in situ within the elastomer host, particularly a smectite clay as a sodium Montmorillonite clay, in which the particles are primarily organoclay platelets, and fragments of such platelets, wherein the platelets are somewhat circular and possibly elliptical in shape having an average, somewhat irregular, diameter, or width, in a range of, for example, about 10 to about 1000 nanometers.

For the description of this invention, the term "organoclay", or "intercalated clay" means, unless otherwise indicated, a clay, particularly a smectite clay such as a Montmorillonite clay, which has been treated with a surfactant, particularly a quaternary ammonium salt in an aqueous solution, so that the surfactant molecules penetrate the region between the; individual clay platelets (the process of intercalation) to thereby modify the surface properties of the individual platelets to have a greater affinity for a diene-based elastomer.

For the description of this invention, the term "clay platelet" means, unless otherwise indicated, an individual, thin, relatively flat, layer contained in a plurality of stacked layers of the above referenced organoclay.

For the description of this invention, the term "exfoliation" means, unless otherwise indicated, the process in which at least a portion of platelets of an intercalated clay, particularly an intercalated smectite clay such as an intercalated Montmorillonite clay, are delaminated in situ within an elastomer host as the intercalated clay is mixed with an elastomer composition at an elevated temperature in a range of about 100° C. to about 175° C.

The smectite clay, preferably the Montmorillonite clay, for use in this invention, might be described as a naturally occurring clay of a structure which is composed of a plurality of stacked, thin and relatively flat, layers, where such individual layers may be of a structure viewed as being composed of very thin octahedral shaped alumina layer sandwiched between two very thin tetrahedrally shaped silica layers to form an aluminosilicate structure. Generally, for such aluminosilicate structure in the naturally occurring Montmorillonite clay, some of the aluminum cations ($Al^{+3}$) are viewed as having been replaced by magnesium cations ($Mg^{+2}$) which results in a net negative charge to the platelet layers of the clay structure. Such negative charge is viewed as being balanced in the naturally occurring clay with hydrated sodium, lithium, magnesium, calcium and/or potassium cations within the spacing (sometimes referred to as "galleries") between the aforesaid aluminosilicate layers, or platelets. The average spacing, between the layers, or platelets, typically is in a range of about 1 to about 5 Angstroms, is largely determined by the nature of such aforesaid cation residues contained with the spacing and by the degree of hydration and which may be measured by x-ray diffraction method.

In the description of this invention, the term "phr" is used to designate parts by weight of a material per 100 parts by weight of elastomer. The terms "rubber" and "elastomer" may be used interchangeably unless otherwise indicated. The terms "vulcanized" and "cured" may be used interchangeably, as well as "unvulcanized" or "uncured", unless otherwise indicated.

SUMMARY AND PRACTICE OF THE INVENTION

In accordance with one aspect of this invention, in a substantially open toroidaly shaped pneumatic rubber tire comprised of a carcass which supports a circumferential tread designed to be ground contacting and which contains two spaced apart, relatively inextensible bead portions, and two sidewall portions which individually extend from each of said bead portions to the tire tread;

wherein said carcass is comprised of at least one carcass ply extending from bead to bead, and optionally at least one belt ply extending circumferentially around said carcass and positioned between said tread and said carcass plies;

wherein said carcass plies and belt plies are individually comprised of a laminate of a rubber composition and a plurality of spaced apart cords disposed in a substantially parallel relationship to each other, wherein said rubber composition encapsulates said cords, and wherein said cords are comprised of one or more filaments, wherein said filaments are selected from brass coated steel filaments, polyester filaments, nylon filaments, aramid filaments and glass filaments;

wherein said carcass optionally contains an apex as a strip of a rubber composition in a shape of an annular ring positioned within a carcass sidewall adjacent to a bead portion of the carcass in a primary annular direction circumferentially co-extensive within the sidewall portion of the carcass and a secondary radial direction extending toward and spaced apart from the tire tread;

wherein said carcass optionally contains a sidewall insert as a strip of a rubber composition in a shape of an annular ring positioned within a carcass sidewall and spaced apart from a carcass bead portion in a primary annular direction circumferentially co-extensive within the sidewall portion of the carcass and a secondary radial direction extending toward and spaced apart from the tire tread;

wherein said rubber composition for said rubber/cord laminate, sidewall insert and said apex, is comprised of, based upon parts by weight of an ingredient per 100 parts by weight elastomer (phr):

(A) 100 phr of at least one diene-based elastomer, and
(B) about 30 to about 100phr of particulate reinforcement dispersed within said elastomer(s) selected from intercalated smectite, preferably Montmorillonite, clay particles, carbon black, synthetic amorphous silica and silica treated carbon black comprised of.
  (1) about one to about ten phr of said intercalated, layered, thin, substantially two dimensional smectite, preferably Montmorillonite, clay particles of which at least a portion thereof is in a form of thin, flat, substantially two dimensional exfoliated platelets derived from said intercalated clay, and
  (2) about 20 to about 99 phr of at least one additional reinforcing filler comprised of carbon black, synthetic amorphous silica and silica treated carbon black, wherein, for the rubber composition of said rubber/cord laminate of said carcass ply and carcass belt ply, a majority of said dispersed, smectite, preferably Montmorillonite, intercalated clay particles and exfoliated platelets have a primary orientation in the plane of the laminate and substantially parallel to said cords an a secondary orientation in the plane of the laminate and substantially at right angles to said cords;

wherein for the rubber composition of said annular sidewall insert strip and annular apex strip, a majority of said dispersed smectite, preferably Montmorillonite, clay particles and exfoliated platelets have a primary orientation in the plane of the strip and substantially parallel to the annular direction of said strip(s) and a second orientation in the plane of the strip and substantially at right angles to the annular direction of said strip(s);

In practice, a coupling agent may also be used to aid in coupling said silica material and said intercalated clay particles and exfoliated platelets, as the case may be, to an associated diene-based elastomer host.

Such coupling agents typically have a moiety which is reactive with hydroxyl groups (e.g. silanol groups) contained on the silica material, intercalated clay and exfoliated platelets, as the case may be depending upon which are present, and another moiety interactive with at least one of said elastomers.

For example, although not intended to be limiting, such coupling agents may include, for example, bis(3-alkoxysilylalkyl) polysulfides, such as, for example, a bis (3-alkoxysilylpropyl) polysulfide having an average of from about 2 to about 2.6 or from 3.5 to about 4, connecting sulfur atoms in its polysulfidic bridge.

For this invention, said smectite, preferably Montmorillonite, clay particles and exfoliated platelets are viewed herein as being in a form of thin, substantially two dimensionally shaped materials in a sense that their planar length and width dimensions are in a range of about 50 to about 2000 nanometers for said particles of stacked platelets and about 50 to about 500 nanometers for said exfoliated platelets, with the length being longer than the width, and with a thickness in a range of about 10 to about 40 nanometers for said particles of stacked platelets and about one nanometer for said exfoliated platelets.

For the oriented particles and platelets, the said "primary orientation" within the rubber composition is the orientation of the particle, or platelet, as the case may be, in the direction of its length and the said "secondary orientation" is the orientation of the particle, or platelet, as the case may be, in the direction of its width. If the length and width should be substantially equal, then the primary and secondary orientations within a respective rubber composition would be substantially indistinguishable.

For example, where a calendered rubber/cord laminate is specified, such laminate is typically prepared via passing cords and associated rubber composition through open roll mills it is contemplated that a major portion of the particles and platelets become aligned, or oriented, with a primary orientation being in a direction of (parallel to) the cords and with a secondary orientation being in a direction perpendicular to the cord direction in the plane of the tire cord ply.

For example, where a rubber composition is extruded through a die to form a shaped rubber strip for use as a sidewall insert of apex of an unvulcanized tire, it is contemplated that a major portion of the particles and platelets become aligned, or oriented, with a primary orientation being in a direction of the extruded strip and with a secondary orientation being in a direction perpendicular to the direction of the extruded strip. Upon building the shaped strip into the tire, the direction of the strip typically assumes a radial direction from the bead portion of the tire, in its sidewall region, toward the tread of the tire.

In one aspect of the invention, the rubber/cord laminate is preferably a circumferential belt ply of rubber/cord of one or more brass plated steel filaments positioned between said tread and said carcass.

In practice, it is to be appreciated that the intercalation of the smectite, preferably Montmorillonite, layered clay can be accomplished, for example, by treating an aqueous dispersion thereof which contains, for example, a quaternary ammonium salt, to cause an expansion of the platelets thereof as hereinafter described.

In practice, it is to be appreciated that at least a portion of the intercalated clay becomes exfoliated to individual thin, flat, platelets by the high shear mixing thereof at an elevated temperature with the associated elastomer composition as hereinafter discussed.

As hereinbefore discussed, in practice, it is to be appreciated that it is contemplated that a majority of said intercalated smectite, preferably Montmorillonite, clay particles and associated exfoliated platelets are oriented within the associated rubber composition by processing the rubber composition via calendering and/or extrusion of the rubber composition to form a calendered rubber/cord laminate, an extruded rubber sidewall insert or an extruded rubber apex, with said orientation being substantially in the direction of the calendering or in the direction of the extrusion of the rubber, as the case may be. The process of calendering rubber and cord together to form a sheet thereof is well known to those having skill in such art. The process of extrusion of a rubber composition via an extruder through a suitable die to form a shaped tire sidewall insert or shaped tire apex is well known to those having a skill in such art.

Accordingly, a significant aspect of providing the rubber composition for the laminate of the rubber/cord component, sidewall insert and apex is the aforesaid primary orientation and secondary orientation of the relatively flat, or planar configured, intercalated clay particles and exfoliated clay platelets. This is considered herein to be significant because a reinforcement of the rubber composition is thereby enhanced in two directions by such particulate orientation in the rubber composition in at least two planar directions of the exfoliated platelets as compared to reinforcement by three dimensional granules of carbon black and/or silica particles.

As hereinbefore discussed; in practice, the smectite, preferably Montmorillonite, clay is preferably intercalated by dispersing said clay in an aqueous solution which contains at least one surfactant (e.g. quaternary ammonium salt) to expand the average spacing between the stacked platelets of said clay to a range of about 10 to about 30 Angstroms.

In practice, for the purposes of this invention, said intercalated clay is homogeneously dispersed in and at least partially exfoliated in situ within its elastomer host by mixing said intercalated clay with said diene-based elastomer(s) at a temperature in a range of about 100° C. to about 175° C. and under conditions sufficient to exfoliate at least a portion of said intercalated clay in an internal mixer.

In practice, it is considered herein that the smectite, preferably Montmorillonite, clay becomes more compatible with the diene-based elastomer host after intercalation of said clay.

For such exfoliation process within the elastomer host, at the elevated temperature, it is preferred that about 30 to about 95, alternately about 30 to about 60 or alternately about 60 to about 95, weight percent of the intercalated clay becomes exfoliated within the elastomer host during the mixing thereof In practice, various diene-based elastomers may be used for the tire component (e.g. tire tread) such as, for example, homopolymers and copolymers of monomers selected from isoprene and 1,3-butadiene and copolymers of at least one diene selected from isoprene and 1,3-butadiene and a vinyl aromatic compound selected from styrene and alphamethyl styrene, preferably styrene.

Representative of such conjugated diene-based elastomers are, for example, cis 1,4-polyisoprene (natural and synthetic), cis 1,4-polybutadiene, styrene/butadiene copolymers (aqueous emulsion polymerization prepared and organic solvent solution polymerization prepared), medium vinyl polybutadiene having a vinyl 1,2-content in a range of about 15 to about 90 percent, isoprene/butadiene copolymers, styrene/isoprene/butadiene terpolymers. Tin coupled elastomers may also be used, such as, for example, tin coupled organic solution polymerization prepared styrene/butadiene copolymers, isoprene/butadiene copolymers, styrene/isoprene copolymers, polybutadiene and styrene/isoprene/butadiene terpolymers.

In the practice of this invention, the grade of purity of cis 1,4-polyisoprene natural rubber is preferred to be of quality, or grade, of Rib Smoked Sheet Number 2 (R.S.S.#2) or better, according to *The Green Book* of the IRQPC. (International Standards of Quality and Packing of Natural Rubber Grades).

In the further practice of this invention, particulate reinforcement for the rubber composition may also include particulate synthetic amorphous silica, or a combination of carbon black and amorphous silica (exclusive of silica treated carbon black), usually of an amount in a range of about 35 to about 100 alternately about 35 to about 90, phr. If a combination of such carbon black and silica is used, usually at least about 5 phr of carbon black and at least 10 phr of silica are used. For example, a weight ratio of silica to carbon black ranging from about 1/5 to 5/1 might be used.

Commonly employed synthetic amorphous silica, or siliceous pigments, used in rubber compounding applications can be used as the silica in this invention, including precipitated siliceous pigments and fumed (pyrogenic) silica wherein aggregates of precipitated silicas are usually preferred.

The precipitated silica aggregates preferably employed in this invention are precipitated silicas such as, for example, those obtained by the acidification of a soluble silicate, e.g., sodium silicate and may include coprecipitated silica and a minor amount of aluminum.

Such silicas might usually be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, Page 304 (1930).

The silica may also be typically characterized by having a dibutylphthalate (DBP) absorption value in a range of about 50 to about 400 cm3/100g, and more usually about 100 to about 300 $cm^3/100$ g.

Various commercially available precipitated silicas may be considered for use in this invention such as, only for example herein, and without limitation, silicas from PPG Industries under the Hi-Sil trademark with designations Hi-Sil 210, Hi-Sil 243, etc; silicas from Rhodia as, for example, Zeosil 1165MP and Zeosil 165GR, silicas from Degussa AG with, for example, designations VN2 and VN3, as well as other grades of silica, particularly precipitated silicas, which can be used for elastomer reinforcement.

If desired, various coupling agents may be used. For example, a bis(3-trialkoxysilylalkyl) polysulfide having an average of 2 to 2.6 or of 3.5 to 4 connecting sulfur atoms in its polysulfide bridge may be used.

It is readily understood by those having skill in the art that the rubber composition would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 1 to about 10 phr. Typical amounts of waxes comprise about 1 to about 5 phr. Often microcrystalline waxes are used. Typical amounts of peptizers comprise about 0.1 to about 1 phr.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 1.5, phr. In another embodiment, combinations of a primary and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The presence and relative amounts of the above additives are not considered to be an aspect of the present invention, unless otherwise indicated herein, which is more primarily directed to the utilization a particulate nanocompsite for enhancing reinforcement of a conjugated diene-based elastomer for a component of a tire (e.g. tire tread).

The mixing of the rubber composition can be accomplished by methods known to those having skill in the rubber mixing art. For example, the ingredients are typically mixed in at least two stages, namely, at least one non-productive stage followed by a productive mix stage. The final curatives are typically mixed in the final stage which is conventionally called the "productive" mix stage in which the mixing typically occurs at a temperature, or ultimate temperature, lower than the mix temperature(s) than the preceding non-productive mix stage(s). The rubber, and fillers such as silica and silica treated carbon black and adhesive agent, are mixed in one or more non-productive mix stages. The terms "non-productive" and "productive" mix stages are well known to those having skill in the rubber mixing art.

The following examples are presented to illustrate the invention and are not intended to be limiting. The parts and percentages are by weight unless otherwise designated.

EXAMPLE I

A series of five, natural cis 1,4-polyisoprene rubber based compositions were prepared which are referred to herein as Samples A through E, with Samples A and B being Control Samples.

Control Sample A is prepared without an addition of clay. Control Sample B is prepared with an addition of non-intercalated Montmorillonite clay.

Samples C, D and E are prepared in which an intercalated Montmorillonite clay s added having an average spacing between its layers, or platelets, of about 25, 20 and 15 Angstroms, respectively.

For this Example, in what is usually referred as a non-productive mixing procedure, samples are prepared by first adding the natural rubber to an internal rubber mixer which had been preheated to a temperature of about 100° C. and first mixing the rubber therein for about 30 seconds minutes to slightly break down the rubber and reduce its viscosity, following which the clay, where applicable, and other indicated ingredients, except for sulfur and associated sulfur vulcanization accelerators, are mixed with the elastomer for a total mixing time of about six minutes, to a temperature of about 160° C., after which the mixture is removed from the rubber mixer, open roll milled, sheeted out and cooled to a temperature below 40° C.

In what is usually referred to a subsequent mixing step, usually referred to as a productive mixing step, the mixture is introduced into an internal rubber mixer and sulfur and vulcanization accelerators are added and mixed for about three minutes to a temperature of about 100° C.

For this Example some degree of exfoliation of the intercalated clay of Samples C, D and F occurs within the Elastomer host so that a relatively homogeneous dispersion of the intercalated clay, delaminated clay platelets, and particles thereof, within the elastomer composition is obtained.

The compositions of Samples A through E are shown in the following Table 1.

TABLE 1

| Material | Sample A Control | Sample B Control | Parts Sample C | Sample D | Sample E |
|---|---|---|---|---|---|
| Non-Productive Mixing Step | | | | | |
| Natural rubber[1] | 100 | 100 | 100 | 100 | 100 |
| Carbon black[2] | 55 | 55 | 55 | 55 | 55 |
| Processing oil[3] | 4 | 4 | 4 | 4 | 4 |
| Zinc oxide | 1 | 1 | 1 | 1 | 1 |
| Tackifying resin | 2 | 2 | 2 | 2 | 2 |
| Clay[4] | 0 | 5 | 0 | 0 | 0 |
| Intercalated clay[5] | 0 | 0 | 5 | 0 | 0 |
| Intercalated clay[6] | 0 | 0 | 0 | 5 | 0 |
| Intercalated clay[7] | 0 | 0 | 0 | 0 | 5 |
| Productive Mixing Step | | | | | |
| Accelerator(s)[8] | 1.6 | 1.6 | 1.6 | 1.6 | 1.6 |
| Sulfur | 3 | 3 | 3 | 3 | 3 |
| Prevulcanization inhibitor[9] | 0.3 | 0.3 | 0.3 | 0.3 | 0.3 |

[1]Cis 1,4-polyisoprene natural rubber of grade TSR-CV (Technical Specification Rubber, Constant Viscosity) which is understood to be of a grade equal to or better than R.S.S.#2 natural rubber.
Rubber, Constant Viscosity)
[2]N326, an ASTM designation Company
[3]Of the naphthenic type rubber processing oil
[4]Montmorillonite clay, not intercalated, having an average spacing between its layers, or platelets, of about 4 Angstroms and obtained as CWC Purified Clay from the Nanocor Company.
[5]Intercalated Montmorillonite clay having an average spacing between its layers, or platelets, of about 25 Angstroms obtained as Closite 15A from the Southern Clay Products Company.
[6] Intercalated Montmorillonite clay having an average spacing between its layers, or platelets, of about 20 Angstroms obtained as Closite 20A from the Southern Clay Products Company.
[7] Intercalated Montmorillonite clay having an average spacing between its layers, or platelets, of about 15 Angstroms obtained as Closite 25A from the Southern Clay Products Company.
[8]Of the sulfonamide type
[9]Of the phthalimide type Various physical properties of the Samples of Table 1 were evaluated and reported in the following Table 2.

In the following Table 2 the terms "UTS" and "RPA" mean "Ultimate Tensile System" and "Rubber Processability Analyzer", respectively.

TABLE 2

| Properties | Sample A Control | Sample B Control | Parts Sample C | Sample D | Sample E |
|---|---|---|---|---|---|
| UTS Modulus/Tensile/ Elongation | | | | | |
| 100%, MPa | 4.28 | 4.06 | 5.67 | 6.08 | 6.12 |
| 200%, MPa | 10.34 | 9.8 | 12.12 | 12.83 | 13.07 |
| Ult tensile strength (MPa) | 24.84 | 23 | 21 | 22.4 | 21.8 |
| Ult elongation (%) | 418 | 394 | 320 | 342 | 363 |
| Molded groove tear[1] | 6.92 | 7.34 | 6.37 | 7.86 | 6.28 |
| RPA at 100° C., 11 Hertz | | | | | |
| G' at 1% strain (kPa)[2] | 3209 | 3283 | 5138 | 4829 | 4659 |
| Tan Delta at 1% strain[3] | 0.104 | 0.105 | 0.133 | 0.12 | 0.114 |

[1]The median molded groove tear strength of vulcanized rubber is measured according to ASTMD624 in which a rectangularly shaped cured rubber samples is obtained having a groove along its longitudinally central axis which basically divides the sample into two halves, namely one half on each side of the center of the groove. The test sample dimension is 2.54 cm wide, 12.7 cm long and 0.64 cm thick. The molded groove has an arc configuration of 14 degrees with a depth of 0.86 cm and a top groove width of 0.84 cm. The test is conducted by measuring the force, in Newtons, to initiate and propagate a tear along the groove in which the halves of the sample, at one end of the sample, are pulled apart at 180° C. angle at a crosshead speed of about 51 cm per minute at about 23° C.
[2]The G' value at one percent strain, or elongation, namely a measure of Storage Modulus, as is well known to those having skill in- such art, is considered herein to be a measure of stiffness, wherein an increase of G' is a corresponding indication of an increase in stiffness of the rubber composition.
[3]The Tan Delta at one percent strain, or elongation, namely a ratio of Loss Modulus to Storage Modulus, as is well known to those having skill in such art, is considered herein to be a measure of hysteresis wherein a lower hysteresis is desirable for better tire rolling resistance (less resistance to rolling) and therefore better associated vehicular fuel economy. A decrease in the Tan Delta value is a corresponding indication of a decrease in hysteresis of the rubber composition.

It can be seen from Table 2 that Samples C, D and E, which contain the organoclay, namely the intercalated Montmorillonite clay and exfoliated intercalated Montmorillonite clay, have a significantly increased G', and therefore stiffness, a proportionally significantly smaller increase in Tan Delta, or hysteresis as compared to both Control Sample A with no added clay and Control Sample B which contained a non-intercalated Montmorillonite clay.

This is considered herein to be significant because a stiffer rubber is obtained for use as a tire component with only small increase in its Tan Delta value.

It can also be seen from Table 2 that the 100 percent and 200 percent Modulus values of Samples C, D and E are appreciably increased as compared to Control Sample A and Control Sample B whereas ultimate tensile strength and ultimately elongation values are only somewhat decreased. Therefore a greater gain in Modulus is observes than loss in tensile strength.

This is considered herein to be significant because the indicated loss in tensile strength can be tolerated when such large increase in modulus is obtained.

While various embodiments are disclosed herein for practicing the invention, it will be apparent to those skilled in this art that various changes and modifications may be made therein without departing from the spirit or scope of the invention.

What is claimed is:

1. A substantially open toroidaly shaped pneumatic rubber tire comprised of a carcass which supports a circumferential tread designed to be ground contacting and which contains two spaced apart, relatively inextensible bead portions, and two sidewall portions which individually extend from each of said bead portions to the tire tread;

wherein said carcass is comprised of at least one carcass ply extending from bead to bead, and optionally at least one belt ply extending circumferentially around said carcass and positioned between said tread and said carcass plies;

wherein said at least one carcass ply and said at least one optional belt ply are individually comprised of a laminate of a rubber composition and a plurality of spaced apart cords disposed in a substantially parallel relationship to each other, wherein said rubber composition encapsulates said cords, and wherein said cords are comprised of one or more filaments, wherein said one or more filaments are selected from brass coated steel filaments, polyester filaments, nylon filaments, aramid filaments and glass filaments;

wherein said carcass contains:

(A) an apex as a strip of a rubber composition in a shape of an annular ring positioned within a carcass sidewall adjacent to a bead portion of the carcass in a primary annular direction circumferentially co-extensive within the sidewall portion of the carcass and a secondary radial direction extending toward and spaced apart from the tire tread, and/or (B) a sidewall insert as a strip of a rubber composition in a shape of an annular ring spaced positioned within a carcass sidewall and spaced apart from a carcass bead portion in a primary annular direction circumferentially co-extensive within the sidewall portion of the carcass and a secondary radial direction extending toward and spaced apart from the tire tread;

wherein said rubber composition for said rubber/cord laminate of said at least one carcass ply said at least one optional belt ply, said sidewall insert and said apex, is comprised of, based upon parts by weight of an ingredient per 100 parts by weight elastomer (phr):

(A) 100 phr of at least one diene-based elastomer, and (B) about 30 to about 100 phr of particulate reinforcement dispersed within said elastomer(s) selected from intercalated smectite clay particles, carbon black, synthetic amorphous silica and silica treated carbon black comprised of:

(1) about one to about ten phr of said intercalated, layered, thin, substantially two dimensional smectite clay particles of which at least a portion thereof is in a form of thin, flat, substantially two dimensional exfoliated platelets derived from said intercalated clay, and (2) about 20 to about 99 phr of at least one additional reinforcing filler comprised of at least one of carbon black, synthetic amorphous silica and silica treated carbon black, wherein, for the rubber composition of said rubber/cord laminate of said at least one carcass ply and said at least one optional belt ply, a majority of said dispersed smectite intercalated clay particles and exfoliated platelets have a primary orientation in the plane of the laminate and substantially parallel to said cords and a secondary orientation in the plane of the laminate and substantially at right angles to said cords;

wherein for the rubber composition of said annular sidewall insert strip and annular apex strip, a majority of said dispersed smectite clay particles and exfoliated platelets have a primary orientation in the plane of the strip and substantially parallel to the annular direction of said strip(s) and a secondary orientation in the plane of the strip and substantially at right angles to the annular direction of said strip(s);

wherein said rubber composition of said annular sidewall insert strip and annular apex strip contains a coupling agent having a moiety reactive with hydroxyl groups contained on said intercalated clay particles, exfoliated platelets, synthetic amorphous silica and silica treated carbon black, and another moiety interactive with at least one of said elastomers, and wherein each of said sidewall insert and/or apex are formed by extruding a rubber composition through a suitable die in order to shape the unvulcanized rubber in a form of a shaped strip of rubber composition in which the intercalated clay particles and exfoliated platelets are substantially oriented in a direction parallel to the direction of the extrudate and the length of the shaped strip, followed by building said shaped strip into and within the tire sidewall portion in a form of annular ring co-extensive with said sidewall as a component thereof, with a major portion of said clay particles and exfoliated platelets thereof having said a primary orientation in the plane of the annular strip substantially parallel to the annular direction of said strip and a secondary orientation in the plane of the annular strip and substantially at right angles to the annular direction of said strip.

2. The tire of claim 1 wherein said coupling agent is a bis(3-trialkoxysilylalkyl) polysulfide having a polysulfidic bridge of sulfur atoms selected from at least one of bis (3-trialkylsilylalkyl) polysulfides (A) having an average of from about 2 to 2.6 sulfur atoms in its polysulfidic bridge, and (B) having an average of from about 3.5 to about 4 sulfur atoms in its polysulfidic bridge.

3. The tire of claim 1 wherein said smectite clay is a Montmorillonite clay.

4. The tire of claim 1 wherein said smectite clay particles and exfoliated platelets are thin, substantially two dimensionally shaped in a sense that their planar length and width average dimensions are in a range of about 50 to about 2000 nanometers for said particles and about 50 to about 500 nanometers for said exfoliated platelets and their thicknesses are in a range of about 10 to about 40 nanometers for said particles and about 1 nanometer for said exfoliated platelets.

5. The tire of claim 2 wherein said smectite clay particles and exfoliated platelets are thin, substantially two dimensionally shaped in a sense that their planar length and width average dimensions are in a range of about 50 to about 2000 nanometers for said particles and about 50 to about 500 nanometers for said exfoliated platelets and their thicknesses are in a range of about 10 to about 40 nanometers for said particles and about 1 nanometer for said exfoliated platelets.

6. The tire of claim 1 wherein said rubber/cord laminate is prepared by passing cords, in a spaced apart parallel relationship to each, and an associated rubber composition through open roll mills in a manner the rubber encapsulates said cords and that a major portion of the particles and platelets are aligned, or oriented, with a primary orientation in the plane of the laminate and in a direction of the cords and with a secondary orientation in the plane of the laminate and a direction at a right angle to the cords.

7. The tire of claim 2 wherein said rubber/cord laminate is prepared by passing cords, in a spaced apart parallel relationship to each, and an associated rubber composition through open roll mills in a manner such that the rubber encapsulates said cords and that a major portion of the particles and platelets are aligned, or oriented, with a primary orientation in the plane of the laminate and in a direction of the cords and with a secondary orientation in the plane of the laminate and a direction at a right angle to the cords.

8. The tire of claim 6 comprised of said rubber/cord laminate as a carcass ply extended from bead to bead of a cord comprised of at least one filament selected from polyester, nylon, aramid, wire and glass filaments.

9. The tire of claim 6 comprised of said rubber/cord laminate as a circumferential belt ply positioned between said tread and said carcass plies and comprised of at least one brass coated steel filament.

10. The tire of claim 1 having said sidewall insert wherein said sidewall insert is in a shape of an annular ring positioned within a carcass sidewall spaced apart from a carcass bead portion in a primary annular direction circumferentially co-extensive within the sidewall portion of the carcass and a secondary radial direction extending toward and spaced apart from the tire tread, and wherein said at least one additional reinforcing filler is comprised of about 35 to about 90 phr of at least one of particulate synthetic amorphous silica and carbon black to the exclusion of silica treated carbon black.

11. The tire of claim 1 having said apex wherein said apex is in a shape of an annular ring positioned within a carcass sidewall adjacent to a bead portion of the carcass in a primary annular direction circumferentially co-extensive within the sidewall portion of the carcass and a secondary radial direction extending toward and spaced apart from the tire tread, and wherein said at least one additional reinforcing filler is comprised of about 35 to about 90 phr of at least one of particulate synthetic amorphous silica and carbon black to the exclusion of silica treated carbon black.

12. The tire of claim 1 wherein said smectite clay is intercalated by dispersing said clay in an aqueous solution which contains at least one surfactant as a quaternary ammonium salt to expand the average spacing between the stacked platelets of said clay to a range of about 10 to about 30 angstroms.

13. The tire of claim 1 wherein said intercalated clay is at least partially exfoliated in situ within its elastomer host by mixing said intercalated clay with said diene-based elastomer(s) at a temperature in a range of about 100° C. to about 175° C. and under conditions sufficient to exfoliate at least a portion of said intercalated clay in an internal mixer.

14. The tire of claim 2 wherein said clay is an intercalated Montmorillonite clay and is at least partially exfoliated in situ within its elastomer host by mixing said intercalated clay with said diene-based elastomer(s) at a temperature in a range of about 100° C. to about 175° C. and under conditions sufficient to exfoliate at least a portion of said intercalated clay in an internal mixer.

15. The tire of claim 1 wherein said intercalated clay is obtained by dispersing the smectite clay comprised of stacked platelets having a spacing therebetween in a range of about 1 to about 5 Angstroms in an aqueous solution which contains quaternary ammonium salt wherein the average spacing between said stacked platelets is thereby expanded to a range of about 10 to about 30 Angstroms and wherein a portion of said intercalated clay is exfoliated in situ within the elastomer host by mixing said intercalated clay and elastomer in an internal mixer to a temperature in a range of about 100° C. to about 175° C.

16. The tire of claim 1 wherein said diene-based elastomer (s) is selected from homopolymers and copolymers of monomers selected from isoprene and 1,3-butadiene and copolymers of at least one diene selected from isoprene and 1,3-butadiene and a vinyl aromatic compound selected from styrene and alphamethyl styrene.

17. The tire of claim 1 wherein said diene-based elastomer (s) is comprised of at least one of cis 1,4-polyisoprene (natural and synthetic), cis 1,4-polybutadiene, styrene/butadiene copolymers (aqueous emulsion polymerization prepared and organic solvent solution polymerization prepared), medium vinyl polybutadiene having a vinyl 1,2-content in a range of about 15 to about 90 percent, isoprene/butadiene copolymers, styrene/isoprene/butadiene terpolymers and tin coupled elastomers selected from at least one of tin coupled organic solution prepared styrene/butadiene co-polymers, isoprene/butadiene copolymers, styrene/isoprene copolymers, polybutadiene and styrene/isoprene/butadiene terpolymers.

18. The tire of claim 1 wherein said coupler is a bis(3-trialkoxysilylalkyl) polysulfide containing sulfur atoms in its polysulfidic bridge wherein said polysulfidic bridge contains an average of from about 3.5 to about 4 sulfur atoms.

19. The tire of claim 1 having said sidewall insert wherein said at least one additional reinforcing filler is comprised of about 35 to about 90 phr of at least one of particulate synthetic amorphous silica and carbon black to the exclusion of silica treated carbon black, and wherein said coupling agent is a bis(3-trialkoxysilylalkyl) polysulfide containing sulfur atoms in its polysulfidic bridge wherein said polysulfidic bridge contains an average of from about 2 to about 2.6 sulfur atoms.

20. The tire of claim 1 having said apex wherein said at least one additional reinforcing filler is comprised of about 35 to about 90 phr of at least one of particulate synthetic amorphous silica and carbon black to the exclusion of silica treated carbon black wherein said coupling agent is a bis(3-trialkoxysilylalkyl) polysulfide containing sulfur atoms in its polysulfidic bridge wherein said polysulfidic bridge contains an average of from about 2 to about 2.6 sulfur atoms.

* * * * *